J. G. SCOTT.
STOVE.
APPLICATION FILED MAR. 29, 1917.
1,296,125.
Patented Mar. 4, 1919.
4 SHEETS—SHEET 3.
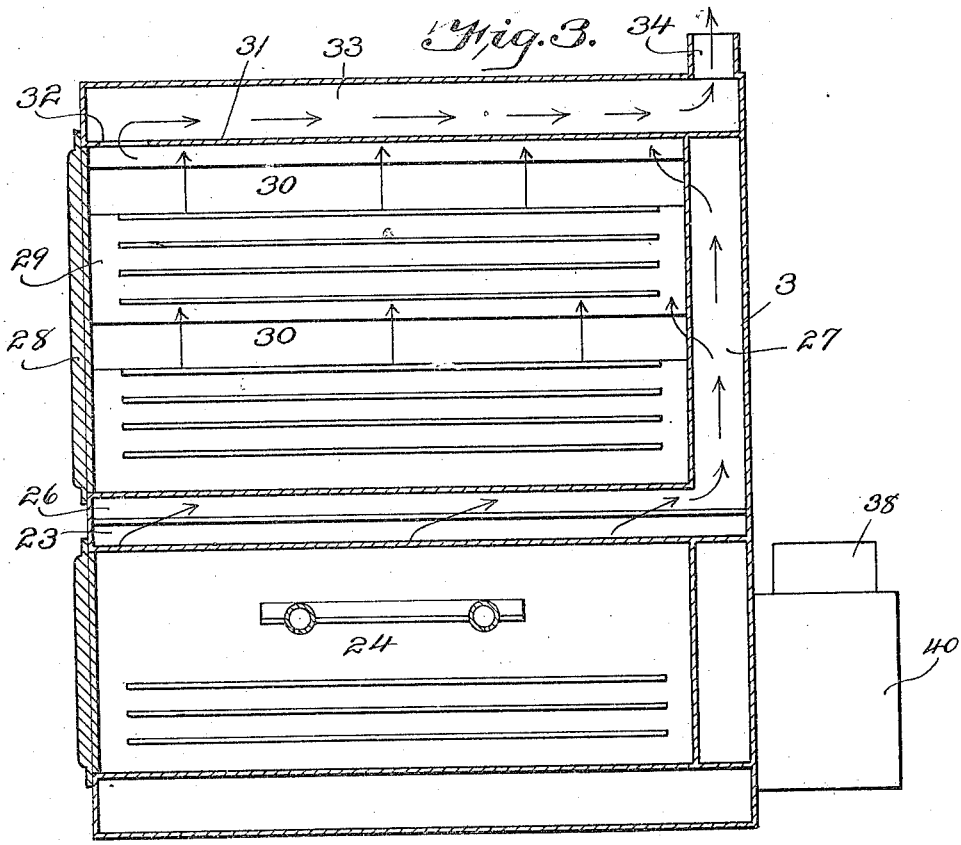
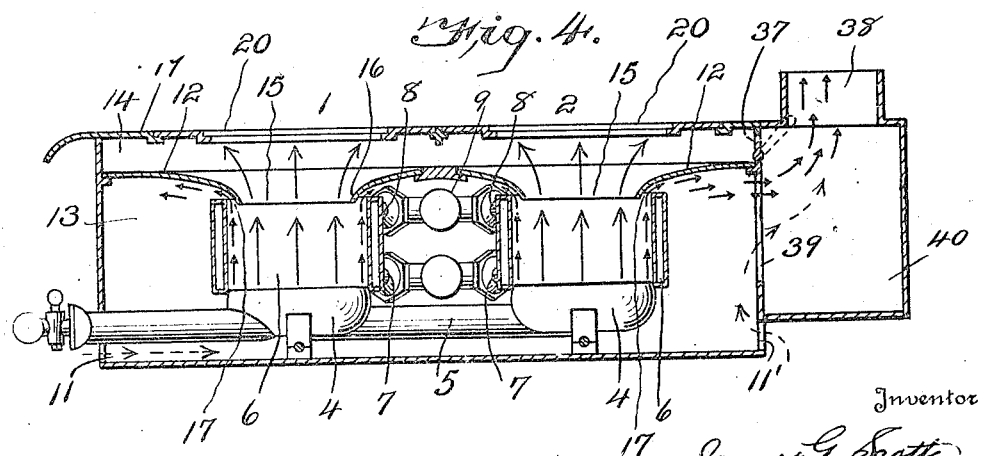
Inventor
James G. Scott
Attorneys

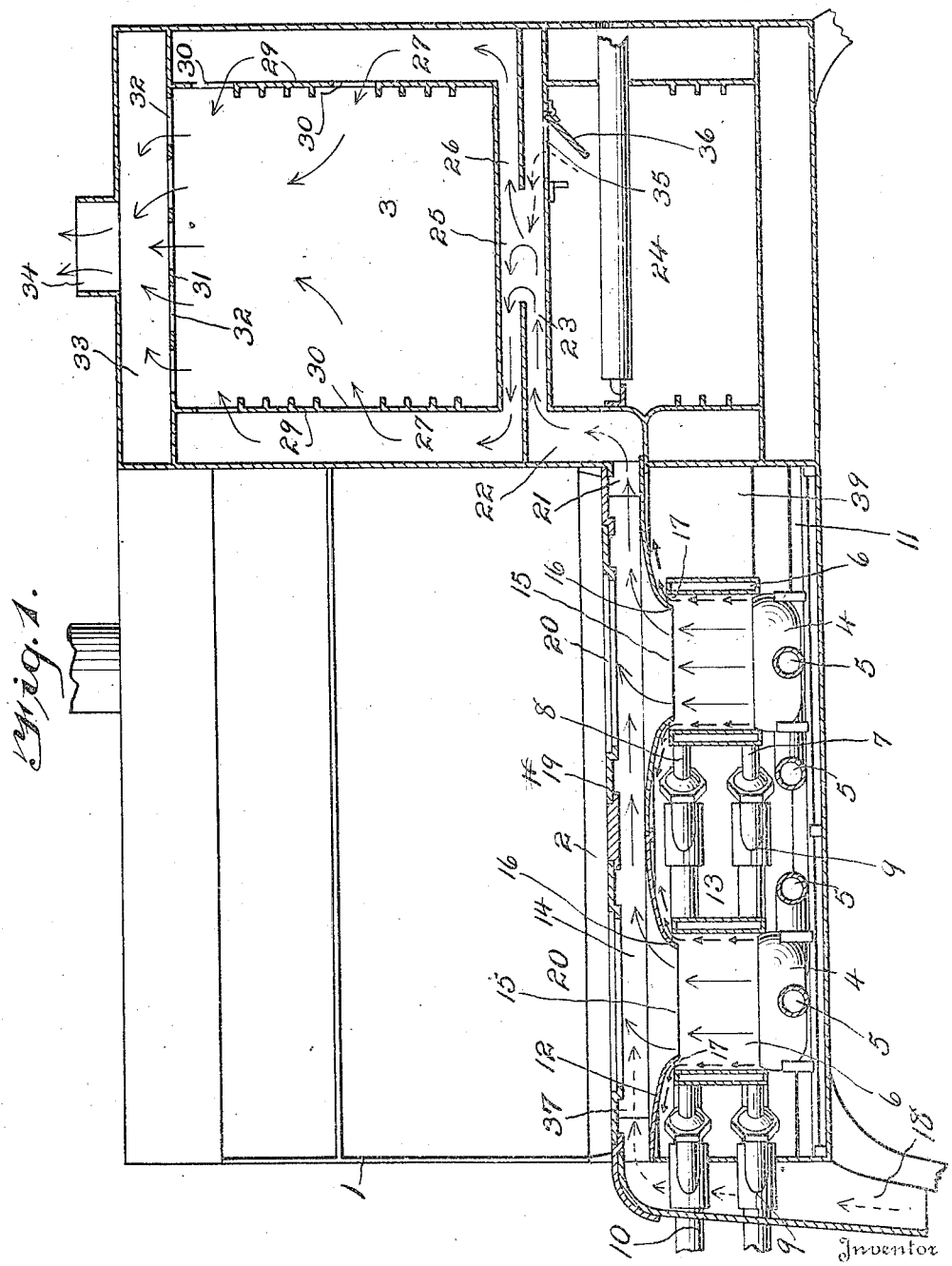

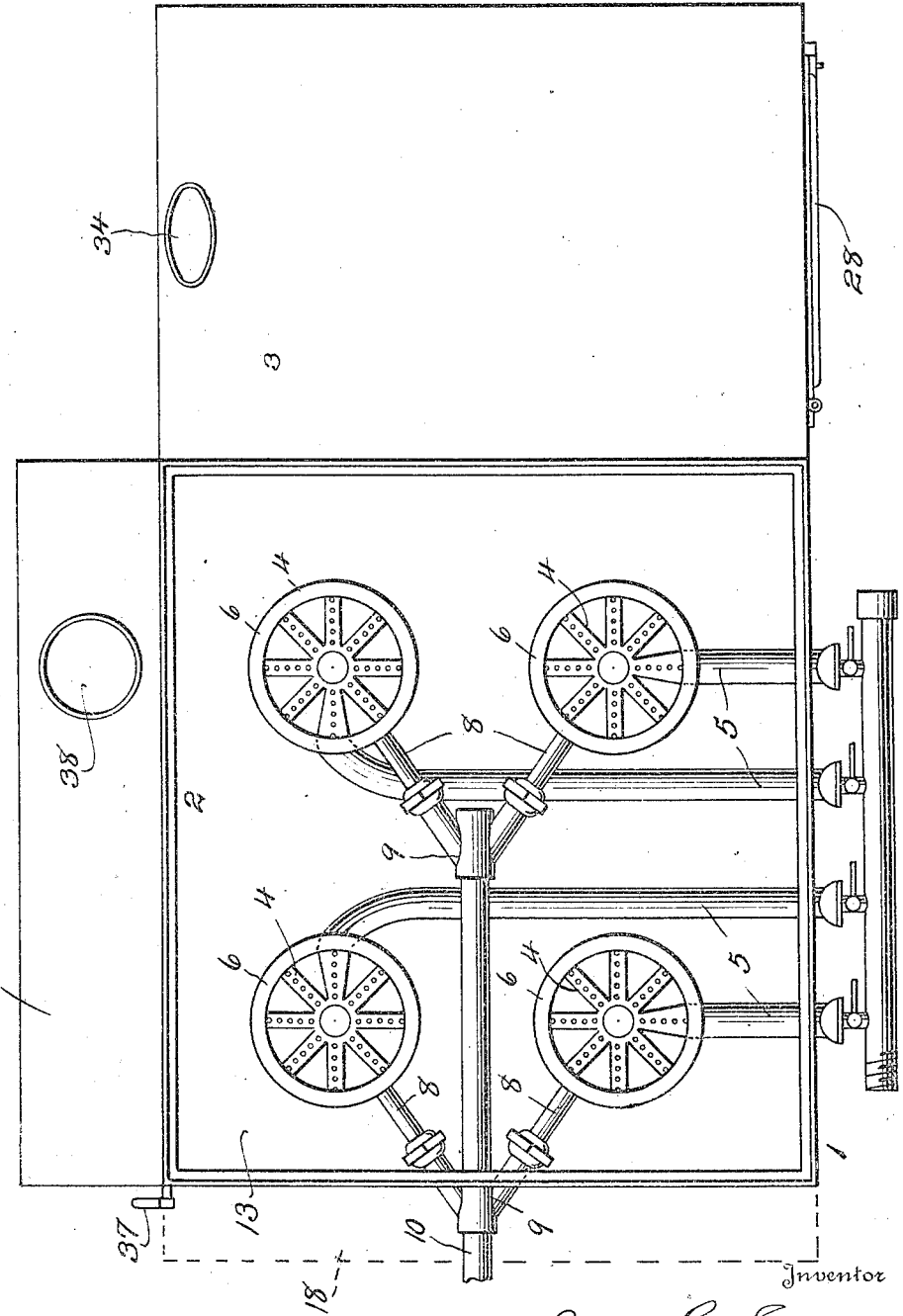

J. G. SCOTT.
STOVE.
APPLICATION FILED MAR. 29, 1917.

1,296,125.

Patented Mar. 4, 1919
4 SHEETS—SHEET 4.

Inventor
James G. Scott
By O. E. Duppe
Attorneys

UNITED STATES PATENT OFFICE.

JAMES G. SCOTT, OF WASHINGTON, DISTRICT OF COLUMBIA.

STOVE.

1,296,125.

Specification of Letters Patent.    Patented Mar. 4, 1919.

Application filed March 29, 1917.    Serial No. 158,288.

*To all whom it may concern:*

Be it known that I, JAMES G. SCOTT, a citizen of the United States, residing at Washington, in the District of Columbia, have invented certain new and useful Improvements in Stoves; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to stoves but more particularly to a domestic cooking stove using gaseous fuel so constructed and arranged that when desired the burners may be employed for heating water and the heat from the burners led to an oven for the purpose of heating the same for baking purposes.

The invention consists in the novel construction of the stove; in the construction for leading-off the carbon monoxid and in the novel draft which increases the efficiency of the burners and enables a sufficient quantity of heated air to pass to the oven for baking purposes.

The invention further consists in certain other novel details of construction and in certain combinations of parts all of which will be first fully described and afterward specifically pointed out in the appended claims.

Referring to the accompanying drawings—

Figure 1 is a longitudinal vertical sectional view through a stove and oven constructed in accordance with this invention.

Fig. 2 is a top plan view illustrating the burners and water backs.

Fig. 3 is a transverse vertical sectional view through the oven.

Fig. 4 is a transverse vertical sectional view through the stove illustrating the arrangement of the burners and the construction for leading-off the carbon monoxid.

Like numerals of reference indicate the same parts throughout the several figures, in which—

Figure 5:
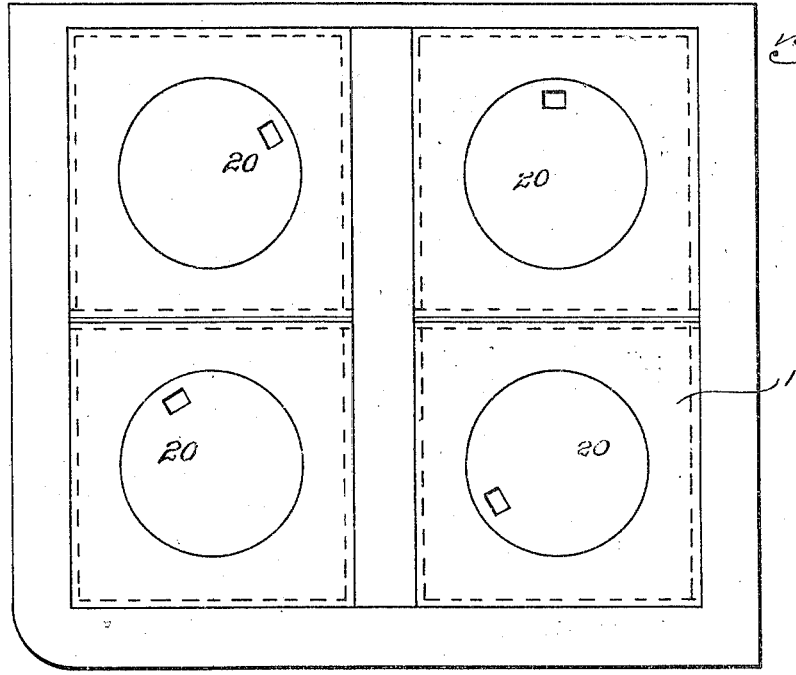
Fig. 5 is a top plan view of the top of the stove.

1 indicates the stove which includes the burner or cooking portion 2 and the oven portion 3. 4 indicates the burners which as shown in Fig. 2 are arranged in usual order, the gas feed pipes for the burners being indicated by the numeral 5. While I illustrate four burners, it is of course understood that stoves constructed in accordance with this invention may have any number of burners.

6 indicates the water backs which as shown in the several figures are cylindrical in formation and are so arranged in connection with the burners 4 as to form a chimney or flue therefor. The water to the burners is led by means of the pipes 7 connected at the bottom of each water back, while the water from the water backs is led through the pipes 8 which pipes are breasted at 9 into a single water pipe 10. From this it will be understood that the cold water enters the water backs at the bottom and passes from the water backs at the top.

Figure 6:
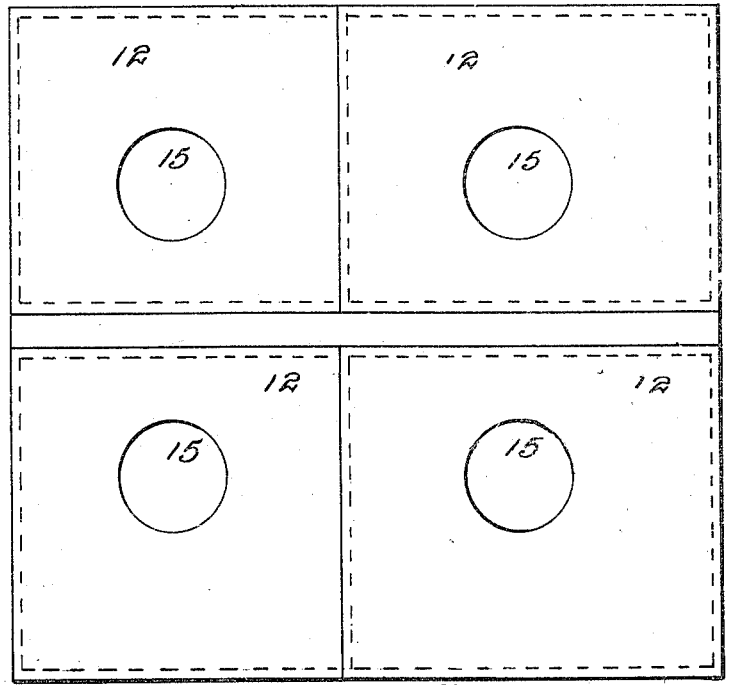
Fig. 6 is a top plan view illustrating the carbon monoxid plates.

Referring now to Fig. 4 it will be seen that the burners 4 are supplied with atmospheric air through a draft opening 11 and it also appear from said figure that I prov... above the water backs a series of plates 12, as are also in plan in Fig. 6, said plates connected with one another to divide the interior of the stove into a lower compartment 13 and an upper compartment 14. Each of the plates 12 is provided with a circular opening 15 through which the heat from the burner 4 passes into the upper compartment 14 while that portion of each of the plates 12 surrounding the openings 15 is depressed at 16 in such manner as to enter the water backs 6 to provide an annular space 17 between the edge of each opening 15 and the top edge of each of the water backs, the said opening 17 at each water back 6 communicating with the lower compartment 13 of the stove.

Referring to Fig. 1 it will be seen that I provide a flue 18 communicating with the upper compartment 14 of the stove so as to lead atmospheric air to said compartment and at a point above the burners 4 and above the carbon monoxid plates 12, so that the combustion of the gaseous fuel is rendered more perfect while at the same time a steady flow of atmospheric air is provided above the burners to be heated thereby to be led to the oven as will be hereinafter described. 19 indicates the top of the stove which is provided with a stove hole plate 20 over each of the burners 4. The top of the stove 19 and stove hole plate 20 receive cooking utensils in the usual manner.

Referring again to Fig. 1 it will be seen that I provide at one side of the stove and in communication with the upper compartment 14 a flue 21 which leads to the oven 3, 22 indicating a passage communicating with a horizontal chamber 23 above a broiling chamber 24. The horizontal chamber 23 is provided centrally with an opening 25 in communication with an upper horizontal chamber 26, said horizontal chamber 26 communicating with a vertical chamber 27 which surrounds the sides and back of the oven 3, the front of the oven being equipped with a door 28 as shown in Fig. 3. Provided in the side walls 29 of the oven is a plurality of horizontal openings 30 communicating with the surrounding chamber 27, while the top 31 of the oven is provided near the door 28 thereof with a plurality of openings 32 communicating with a top horizontal chamber 33, which top horizontal chamber 33 communicates directly with the discharge flue 34.

I prefer to provide below the lowermost horizontal chamber 23 a damper controlled opening 35 which communicates with the interior of the broiler compartment 24 so that when said broiler compartment 24 is not in use the damper 36 can be opened as shown in Fig. 1 in order to allow atmospheric air to pass therefrom into the said horizontal chamber 23, the purpose of this construction being to cause the heated air from the stove to branch in the directions of the arrows as shown in Fig. 1, so as to insure a uniform heating of the oven 3.

For the purpose of a more ready understanding of the currents, I have illustrated the direction and flow of the hot air by long full arrows and have indicated the direction and flow of atmospheric air by dotted arrows, while I have indicated the direction and flow of the carbon monoxid by short heavy arrows.

As will appear in Figs. 1 and 4 I provide at the back of the stove and in communication with the upper compartment 14 a damper 37 which is in communication with the carbon monoxid flue 38. The purpose of this construction is to allow the hot air from the upper compartment 14 to pass into the monoxid flue 38 when it is not desired to lead the same to the oven 3. It will also be seen from Fig. 4 that I provide under said damper 37 and in communication with the lower compartment 13 a large opening 39 communicating with a chamber 40 which receives the carbon monoxid from the lower compartment 13 to pass therefrom into the carbon monoxid flue 38 as indicated by the short heavy arrows. By means of the damper arrangement 37 I am enabled to regulate the quantity of heat passing to the oven in such manner as to direct all of the hot air into the oven or only a portion thereof as may be found expedient. Upon full opening of the damper 37 practically all of the hot air discharged into the carbon monoxid flue 38 is piped to the outer atmosphere so that the noxious gases and the excessive heat from the stove will be led to the outer atmosphere.

Having thus fully described the invention its operation is as follows:

The stove being constructed in the manner as just described the carbon monoxid gas formed by reason of the cooling of the burner flames against walls of the water backs 6 passes under the carbon monoxid plates 12 and between the water backs and said plates and into the lower compartment 13 through the openings 17 at the tops of the water backs and from said compartment 13 into the discharge flue 38. The flame from the burners 4 passes up through the water backs 6 and through the circular openings 15 in the carbon monoxid plates 12 and into the upper compartment 14. At this point atmospheric air passing through the flue 18 meets the burner flame causing a more perfect combustion and consequently a greater and more intense heat which is delivered under the top of the stove and caused to follow the direction of the arrows in Fig. 1 into the chamber 22 and around and into the oven 3 in the manner as heretofore described. By means of this construction a sufficient quantity of hot air is provided by the burners 4 to be used for baking purposes, while at the same time the water backs provide a sufficient quantity of hot water for all ordinary household purposes, it being understood that the heating of the water and the heating of the oven as described is effected by the burners which are employed for cooking purposes and that no additional burners are required to effect the water heating and the oven heating. On the contrary I have found that the drafting of the stove by means of the flue 18 causes a more intense heat than would be possible with the ordinary stove construction and I am therefore enabled to operate a stove constructed in accordance with this invention, more economically and with a less consumption of fuel than as usual with stoves of ordinary design.

Having thus fully described the invention, it is of course apparent that the construction as shown and described is susceptible to certain changes in the construction and arrangement of the parts and I consider myself clearly entitled to all such changes and modifications as fall within the limit and scope of the appended claims.

What I claim as new and desire to secure by Letters Patent of the United States is—

1. A stove of the character described having an upper and a lower compartment, a burner disposed in the lower compartment, a water back located above the burner and surrounding the flame of the burner, a partition for dividing the stove into the said upper and lower compartments, the said water back extending to a point adjacent the said partition, the said partition being provided with an opening through which heat from the burner may pass into the upper compartment, the said partition in connection with the said water back providing a passage between the partition and the water back through which carbon monoxid gas may pass into the said lower compartment, an oven in communication with the said upper compartment, said upper compartment being provided with a draft flue in communication with the atmosphere to admit atmospheric air into the said upper compartment above the said partition to create a draft horizontally of said upper compartment and in the direction of and into the said oven, the said lower compartment being provided with a suitable draft opening to supply draft to the burner and a carbon monoxid flue in communication with the lower compartment to lead the noxious gas therefrom, substantially as described.

2. A stove of the character described including a casing dividing into an upper and a lower compartment, a burner in the lower compartment, a water back above the burner to encompass the flame of the burner, a partition for partitioning the stove into the said upper and lower compartments, said partition being provided with an opening above the burner to allow heat from the burner to pass into the upper compartment, the said water back terminating at a point adjacent the said partition to provide an opening between the said partition and the said water back for the passage of carbon monoxid gas from the water back into the said lower compartment, an oven in communication with the said upper compartment to receive heat therefrom and an auxiliary draft port for said upper compartment in communication with the atmosphere for admitting auxiliary air into the said upper compartment and above the said partition to create a draft horizontally of said upper compartment and in the direction of and into the said oven, said lower compartment being provided with a suitable draft port for the burner, substantially as described.

3. A stove of the character described, including a casing divided into an upper and a lower compartment, a burner in the lower compartment, a water back above the burner to encompass the flame of the burner, a partition for partitioning the stove into the said upper and lower compartments, said partitions being provided with an opening above the burner to allow heat from the burner to pass into the upper compartment, the said water back terminating at a point adjacent the said partition to provide an opening between the said partition and the said water back for the passage of carbon monoxid gas from the water back into the said lower compartment, an oven in communication with the said upper compartment to receive heat therefrom and an auxiliary draft port for said upper compartment in communication with the atmosphere for admitting auxiliary air into the said upper compartment and above the said partition to create a draft horizontally of said upper compartment and in the direction of and into the said oven, substantially as described.

4. A stove of the character described comprising burners disposed under the cooking surface of the stove, said burners being disposed in relation to the cooking surface of the stove to provide a horizontal compartment between the burners and the cooking surface of the stove, said horizontal compartment being provided with a draft opening in communication with the atmosphere and above said burners to create a draft horizontally of said horizontal compartment, and an oven in communication with said horizontal compartment to receive heat therefrom.

In testimony whereof, I affix my signature, in presence of two witnesses.

JAMES G. SCOTT.

Witnesses:
C. HUGH DUFFY,
FRANK J. SCOTT.